United States Patent [19]

Vickers

[11] Patent Number: 4,790,718

[45] Date of Patent: Dec. 13, 1988

[54] MANIPULATORS

[75] Inventor: Mark G. Vickers, Littlethorpe, United Kingdom

[73] Assignee: The English Electric Company plc, London, United Kingdom

[21] Appl. No.: 844,564

[22] Filed: Mar. 27, 1986

[30] Foreign Application Priority Data

Mar. 27, 1985 [GB] United Kingdom ................ 8508387
Apr. 12, 1985 [GB] United Kingdom ................ 8509402

[51] Int. Cl.[4] .............................................. B25J 9/10
[52] U.S. Cl. ..................................... 414/735; 248/653; 901/23; 901/28
[58] Field of Search .................. 414/680, 735; 901/28, 901/29, 25, 22, 23; 248/653, 654; 182/2; 318/568

[56] References Cited

U.S. PATENT DOCUMENTS

| 3,559,936 | 2/1971  | Guyon    | 248/179 |
| 3,779,400 | 12/1973 | Brockman |         |
| 4,362,977 | 12/1982 | Evans et al. | 318/568 |
| 4,407,625 | 10/1983 | Shum     |         |
| 4,435,116 | 3/1984  | Deberg   | 414/728 |
| 4,569,627 | 2/1986  | Simunovic | 414/735 |

FOREIGN PATENT DOCUMENTS

| 422580  | 9/1974 | U.S.S.R. ............................ | 901/28 |
| 1083017 | 3/1984 | U.S.S.R. ............................ | 901/28 |
| 2083795 | 3/1982 | United Kingdom . |  |

Primary Examiner—Robert J. Spar
Assistant Examiner—Donald W. Underwood
Attorney, Agent, or Firm—Spencer & Frank

[57] ABSTRACT

A manipulator comprises three arms 1 which can pivot at different points on a supporting structure 6 and which can be driven longitudinally to adjust their effective lengths. The longitudinal axes of the three arms intersect at a common point but their lower ends are offset from this point and are pivoted about respective axes which also intersect at the aforementioned common point. They are pivotted to an end effector mounting flange 8 which optionally comprises a fourth arm 11 which slides and pivots on the supporting structure. The fourth arm serves to ensure that the flange 8 always faces at a known orientation. It can also be used in co-operation with suitable sensors to produce signals on lines 15, 16 and 18 to a control unit which drives the arms 1 in their linear directions.

11 Claims, 2 Drawing Sheets

MANIPULATORS

BACKGROUND OF THE INVENTION

The invention relates to a manipulator for controlling the position of what is referred to as an "end effector"; which term covers such things as tools, gripping devices and holding devices. The invention concerns the type of manipulator which includes at least three arms each connecting the end effector to a fixed point on a supporting structure. In such a construction the effective length of each arm is adjusted to position the end effector as required.

One known manipulator of the aforementioned type is described in our U.K. Patent Specification No. 2083795. This system is able to manipulate an end effector to any desired point in a volume of space and also to orientate it at a desired orientation at that point. For this purpose the manipulator includes six, instead of three, control arms. The problem with this arrangement is that it is relatively complex and that the degree of adjustment of orientation of the end effector, for any particular position of it in the aforementioned volume of space, is limited.

Another known manipulator is described with reference to FIG. 1 in U.S. Pat. No. 4,407,625. This comprises three arms connected at their bottom ends by a pivot mechanism allowing all three to pivot relative to each other about a common point. The end effector is connected to one of the three arms. A manipulator of this type does not allow orientation of the end effector when it has been moved to a desired point. Such adjustment of orientation is not necessarily a disadvantage since the end effector itself can be provided with a special wrist mechanism providing a freedom for adjustment of orientation through large angles (greater than the angles provided for by the arrangement of U.K. Specification No. 2083795). Also of course some types of end effector, including that shown in U.S. Pat. No. 4,407,625, do not require such adjustment of orientation. A problem however with the arrangement described in the U.S. Specification is that the pivot arrangement at the bottom of arms is relatively complex and that there is no way in which the end effector can be connected directly to the pivot point. This means that, to move the end effector to a given point, it is necessary to take into consideration an offset between the end effector and the pivot point. The need for this complicates the control system.

SUMMARY OF THE INVENTION

This invention provides a manipulator having three arms of variable effective length connecting fixed points on a supporting structure to an end effector mounting characterised in that the three arms are connected to different points on the mounting for rotation about respective axes fixed with respect to the mounting and the three axes intersect at a common point, and means are provided for varying the effective length of the three arms by sliding them through the said fixed points along axes passing through said common point.

Each arm is preferably connected to the mounting by a pivot which allows rotation about only one fixed axis. This makes for a more rigid and relatively simple construction.

By employing the invention only three simple pivots are required instead of the complex pivotting arrangement of the aforementioned U.S. Pat.

Also, the difficulty of mounting the end effector in the design of the system described in the U.S. Pat. No. 4,407,625 is removed. This is because an inherent part of the invention is an end effector mounting member.

In a preferred form of the invention the end effector mounting includes a fourth arm, which is preferably straight, and which joins the end effector to the supporting structure by connections which allow the fourth arm to pivot about two intersecting orthogonal axes perpendicular to its length and to slide longitudinally relative to the frame. One advantage of this arrangement is that the position of the end effector can be determined by three sensors which monitor the angles of rotation and the longitudinal displacement of the fourth arm. Furthermore, the end effector is held more rigidly than would be the case without the fourth arm.

The provision of the fourth arm is considered to be a useful and novel feature in itself applicable to other systems, for example to systems with a complex pivot arrangement like that described in U.S. Pat. No. 4,407,625. A problem with this design of manipulator is that the arm jointing is complex and the end effector is displaced from the point at which the arms intersect, so it requires a complex control system to calculate the relationship between the positions of one or more of the arms and the position of the end effector. Thus, according to a second aspect of this invention there is provided a manipulator having at least three arms, some of which are of variable effective length, connecting points on a supporting structure to an end effector mounting; and an extra arm joining the end effector mounting to the supporting structure, the extra arm being able to pivot and to slide longitudinally relative to the supporting structure.

The extra arm is preferably straight and is adapted to be attached directly to the end effector. The position of the end effector may then be calculated from the angles of rotation and the longitudinal displacement of the fourth arm. Furthermore, the end effector may be held more rigidly than would be possible without the fourth arm.

DESCRIPTION OF THE PREFERRED EMBODIMENTS

Figure 1:
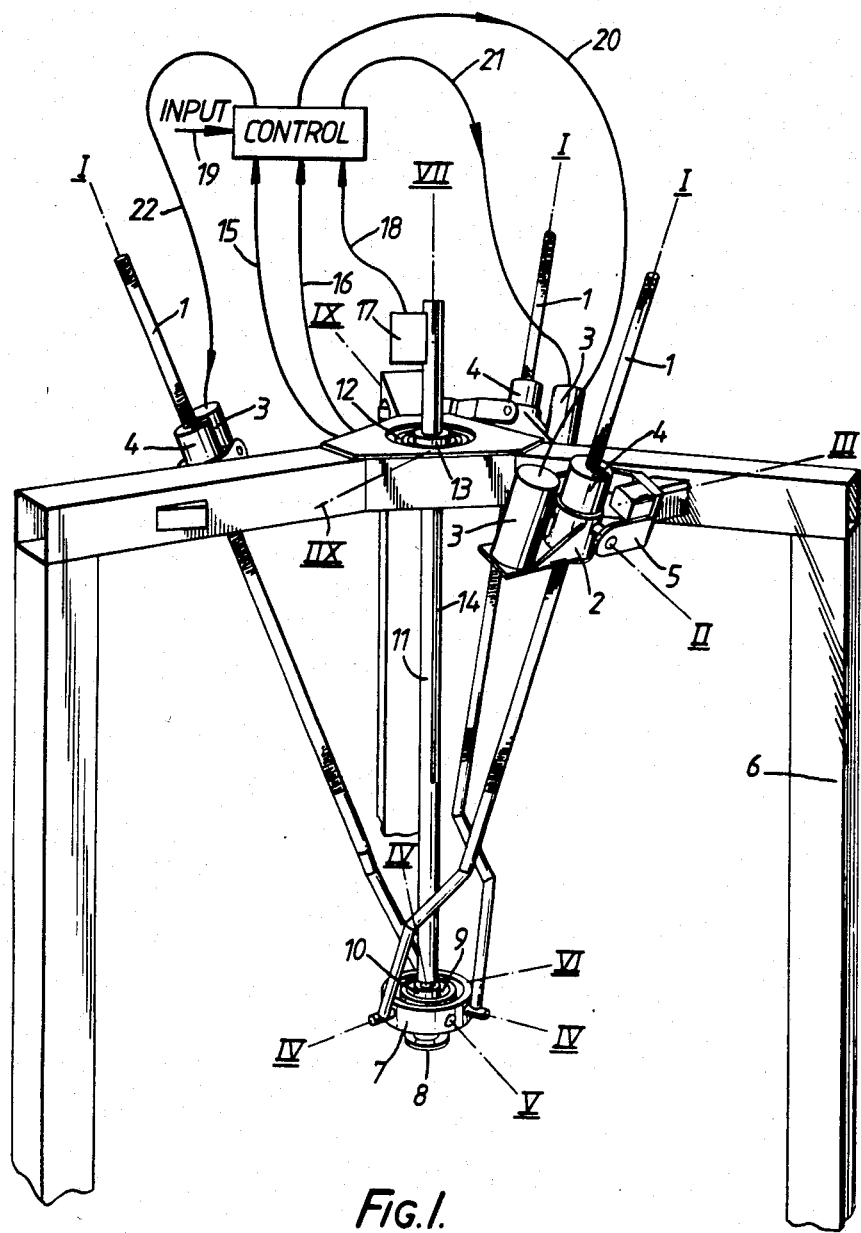
FIG. 1 is a drawing of a manipulator constructed in accordance with one embodiment of the invention.

Referring to the FIG. 1 three screw threaded control arms 1 are driven longitudinally in the direction of axes I by drive mechanisms 2 each including a motor 3 and drive 4 co-operating with the screw thread. Axes I intersect at a common point which will be referred to later.

Each drive mechanism 2 is pivotted about an axis II to a bifurcated support 5. The latter is pivotted about an axis III to a supporting structure 6. In FIG. 1, Each associated group of axes I, II and III are mutually orthogonal to each other, although this is not essential; it is sufficient for axes I and II to be orthogonal and axes II and III to be orthogonal, and axes I, II and III intersect at a common point.

Each arm 1, has a double bend which offsets its lower end from its axis I of longitudinal movement. This offset lower end is pivotted about an axis IV to respective positions spaced around a ring 7 forming part of an end effector support (formed by components 7-14). The axes IV are symmetrically arranged in a plane (which is horizontal in the position illustrated) and they intersect at a common point in that plane.

The end effector support comprises a mounting plate 8 which is attached to the fourth arm 11. In an alternative construction (not shown) the parts 7 and 8 are replaced by a single rigid mounting bracket to which the end effector is attached; and no further components are needed since the longitudinal position of adjustment of the three arms can be used to move the end effector to any desired position within a space between the legs of the supporting structure. However in such an alternative arrangement there may be undue bending loads transmitted to the arms particularly if the manipulator is required to handle a heavy load. Also, the orientation of the end effector support may be difficult to calculate and this information will be needed in some circumstances e.g., when the end effector includes a wrist mechanism. The preferred features now to be described help to overcome these problems.

Figure 2:
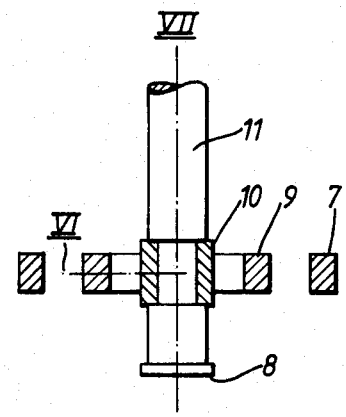
FIG. 2 is a cross-sectional view of the optional fourth arm and the end effector support.

In the illustrated construction the end effector support also includes a ring 9 (see FIG. 2) which is pivotted to the ring 7 about an axis V and to an inner bush 10 about an axis VI. Axes V and VI intersect at the same point, and this point is the same as that at which axes I and IV intersect. The bush 10 has a central bore which receives a reduced diameter portion at the lower end of a fourth arm 11 in such a way as to allow the bush 10 to rotate relative to the arm 11.

Figure 3:
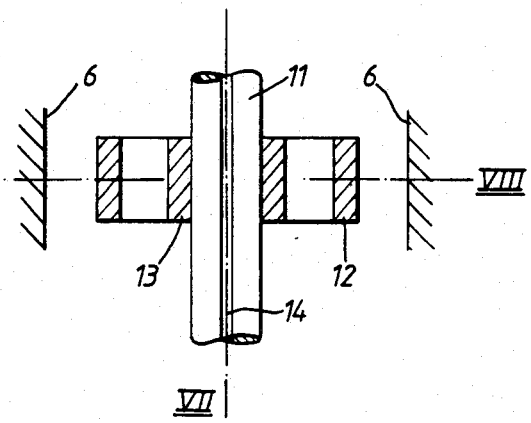
FIG. 3 is a cross-sectional view of the optional fourth arm and its connection to the supporting structure.

This rotation takes place about a longitudinal central axis VII which passes through the same point as that at which the axes I, IV, V and VI intersect. The fourth arm 11 is connected to a fixed point on the supporting structure 6 by a gimbal mechanism shown in detail in FIG. 3 and comprising an inner ring 13 pivoted to a second ring 12 about an axis IX, the ring 12 being pivotted to the supporting structure 6 about an axis IIX, the fourth arm 11 is also rigidly connected at its lower end to the bracket 8. In the drawings, The axes VII, IIX and IX are mutually orthogonal to each other, although this is not essential; it is sufficient for axes VII and IX to be orthogonal and for axes IIX and IX to be orthogonal, and axes VII, IIX and IX intersect at a common point. The fourth arm 11 is able to slide longitudinally in the direction of axis VII through an inner ring 13. It has a slot 14 which receives an inwardly pointing projection on the ring 13 to key it against axial rotation about axis VII relative to the supporting structure 6. Operation of the motors 5 control the effective lengths of the arms 1. The effective lengths are the distances between the points where axes I, II and III intersect and the point where axes IV and I intersect. The choice of appropriate effective lengths of the arms 1 uniquely defines the position in space of the last mentioned point which is the effective point at which the end effector is mounted. The orientation of the end effector is constrained by the fourth arm 11 always to be the line adjoining the last mentioned point to the fixed point on the supporting frame 6 where axes VIII and IX intersect.

Suitable sensors, not shown produce signals on lines 15 and 16 representing the degree of rotation of the arm 11 about axes IIX and IX respectively whilst a linear position encoder 17 produces a signal on line 18 representing its position along the axis VII. This information completely defines the position of the end effector and is compared in a control circuit 19 with the desired position entered at 19 to produce correction signals on lines 20, 21 and 22 to operate the motors 3 in directions such as to reduce the difference between the real and required positions.

I claim:

1. A manipulator having: three arms connecting fixed points on a supporting structure to an end effector mounting, the three arms each being pivotally connecting to different fixed points on the mounting to allow rotation of the arms relative to the mounting about respective axes which intersect at a common point and which are co-planar; and three drive means each acting on a part of a corresponding arm so as to drive that part along a straight line passing through the said common point, said mounting including a fourth arm and a slidable connection operable to permit the fourth arm to pivot and to slide longitudinally relative to the supporting structure, said forth arm being connected to the end effector.

2. A manipulator according to claim 1 in which each arm is connected to the mounting by a pivot which allows rotation about only one fixed axis.

3. A manipulator according to claim 1 including means for sensing movement and/or position of the fourth arm and for controlling the drives in response.

4. A manipulator comprising: three arms connecting fixed points on a supporting structure to an end effector mounting, the three arms each being pivotally connected to different fixed points on the mounting to allow rotation of the arms relative to the mounting about respective axes which intersect at a common point and which are coplanar; and three drive means each acting on a part of a corresponding arm so as to drive that part along a straight line passing through the said common point and additionally including an extra arm joining the end effector mounting to the supporting structure, and a joint between the extra arm and the supporting structure, said joint being a slidable connection operable to permit the extra arm to pivot and to slide longitudinally relative to the supporting structure.

5. An extra arm as claimed in claim 4 wherein the extra arm is straight.

6. An extra arm as claimed in claim 4 wherein the end effector is attached directly to the end of the extra arm.

7. An extra arm as claimed in claim 4 wherein the position of the end effector is calculated from the angles of rotation and longitudinal displacement of the extra arm.

8. An extra arm as claimed in claim 5 wherein the end effector is attached directly to the end of the extra arm.

9. An extra arm as claimed in claim 5 wherein the position of the end effector is calculated from the angles of rotation and longitudinal displacement of the extra arm.

10. An extra arm as claimed in claim 6 wherein the position of the end effector is calculated from the angles of rotation and longitudinal displacement of the extra arm.

11. An extra arm as claimed in claim 8 wherein the position of the end effector is calculated from the angles of rotation and longitudinal displacement of the extra arm.

* * * * *